US008656106B2

(12) United States Patent
Cox et al.

(10) Patent No.: US 8,656,106 B2
(45) Date of Patent: Feb. 18, 2014

(54) MANAGING UNFORCED INJECTIONS OF CACHE LINES INTO A CACHE UTILIZING PREDETERMINED ADDRESS RANGES

(75) Inventors: Jason A. Cox, Raleigh, NC (US); Praveen G. Karandikar, Cary, NC (US); Eric F. Robinson, Raleigh, NC (US); Mark J. Wolski, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 12/969,644

(22) Filed: Dec. 16, 2010

(65) Prior Publication Data

US 2012/0159086 A1    Jun. 21, 2012

(51) Int. Cl.
*G06F 12/00* (2006.01)

(52) U.S. Cl.
USPC ............................ 711/124; 711/146; 711/163

(58) Field of Classification Search
USPC .................................. 711/133, 124, 146, 163
See application file for complete search history.

(56) References Cited

U.S. PATENT DOCUMENTS

| 5,956,744 | A * | 9/1999 | Robertson et al. ............ 711/122 |
| 7,069,390 | B2 | 6/2006 | Chen et al. |
| 2006/0168403 | A1 * | 7/2006 | Kolovson ....................... 711/142 |

FOREIGN PATENT DOCUMENTS

WO    WO 2010/004497 A1    1/2010

OTHER PUBLICATIONS

Milenkovic, et al., "Cache Injection On Bus Based Multiprocessors," Proceedings of the Workshop on Advances in Paralle and Distributed Systems, (held in conjunction with 17th IEEE Symposium on Reliable Distributed Systems), West Lafayette, Indiana, Oct. 1998.
Wong, et al., "Modified LRU Policies For Improving Second-Level Cache Behavior," Proceeding of the Sixth International Symposium on High-Performance Computer Architecture, Toulouse, France, Jan. 2000.
Jiang, et al., "Making LRU Friendly To Weak Locality Workloads: A Novel Replacement Algorithm To Improve Buffer Cache Performance," IEEE Transactions On Computers, pp. 939-952, vol. 54, No. 8, Aug. 2005.
Nikiforos, et al., "A Run-Time Configurable Cache/Scratchpad Memory With Virtualized User-Level RDMA Capability," 6th HiPEAC Industrial Workshop, Palaiseau, France, Nov. 2008.

* cited by examiner

*Primary Examiner* — Kalpit Parikh
(74) *Attorney, Agent, or Firm* — Edward J. Lenart; H. Daniel Schnurmann; Biggers Kennedy Lenart Spraggins LLP

(57) ABSTRACT

Methods, apparatuses, and computer program products are disclosed for cache management. Embodiments include receiving, by a cache controller, a request to insert a new cache line into a cache; determining, by the cache controller, whether the new cache line is associated with a forced injection; in response to determining that the new cache line is associated with a forced injection, accepting, by the cache controller, the insertion of the new cache line into the cache; and in response to determining that the new cache line is not associated with a forced injection, determining, by the cache controller, whether to accept the insertion of the new cache line based on a comparison of an address of the new cache line to a predefined range of addresses.

18 Claims, 4 Drawing Sheets

MANAGING UNFORCED INJECTIONS OF CACHE LINES INTO A CACHE UTILIZING PREDETERMINED ADDRESS RANGES

BACKGROUND OF THE INVENTION

1. Field of the Invention

The field of the invention is data processing, or, more specifically, methods, apparatuses, and products for cache management.

2. Description of Related Art

In a multi-processor system, there are various reasons to insert a cache line into a storage area (cache) provided for a neighboring processing core. Sometimes this is used to hold data which has been evicted due to capacity shortage from a neighboring cache. Another cause for the insertion is a co-processor may choose to put a certain cache line with specific data into the cache of a processor so the processor can easily access the data without having to go out into memory to try to find the cache line. In response to receiving a request to insert a new cache line into a cache, a cache controller for the cache may determine whether to reject or accept the insertion.

SUMMARY OF THE INVENTION

Methods, apparatuses, and computer program products are disclosed for cache management. Embodiments include receiving, by a cache controller, a request to insert a new cache line into a cache; determining, by the cache controller, whether the new cache line is associated with a forced injection; in response to determining that the new cache line is associated with a forced injection, accepting, by the cache controller, the insertion of the new cache line into the cache; and in response to determining that the new cache line is not associated with a forced injection, determining, by the cache controller, whether to accept the insertion of the new cache line based on a comparison of an address of the new cache line to a predefined range of addresses.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Example methods, apparatus, and computer program products for cache management in a multiprocessing computer according to embodiments of the present invention are described with reference to the accompanying drawings, beginning with FIG. 1.

Figure 1:
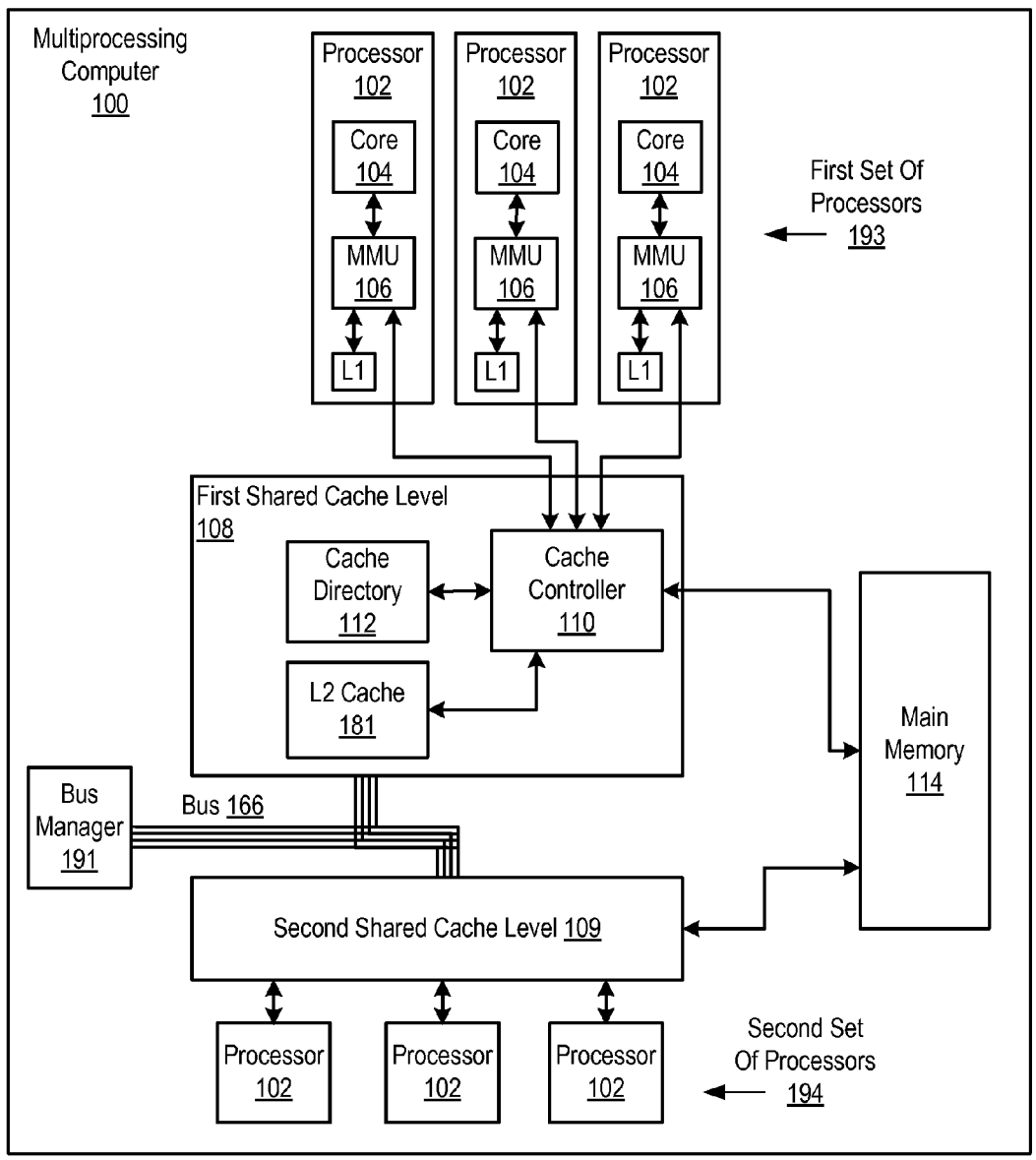
FIG. 1 sets forth a functional block diagram of an example of a computer that implements cache management according to embodiments of the present invention.

FIG. 1 sets forth a functional block diagram of an example of a computer (100) that implements cache management according to embodiments of the present invention.

The example computer (100) in FIG. 1 includes several computer processors (102). Each processor (102) includes a compute core (104) that is coupled for memory operations through a memory management unit ('MMU') (106) to a shared cache level and to main memory (114). In the example of FIG. 1, a first set (193) of processors is coupled to a first shared cache level (108) and a second set (194) of processors is coupled to a second shared cache level (109). The first shared cache level (109) includes a cache directory (112), a cache controller (110), and an L2 cache (181). The second shared cache level (109) includes the following components of the first shared cache level (108): a cache directory, a cache controller, and an L2 cache. The second set (194) of processors may request insertion of cache lines from the second shared cache level (109) into the first shared cache level (108). In this case, a cache controller (not pictured) in the second shared cache level (109) may transmit the request to the cache controller (110) in the first shared cache level (108). The cache controller (110) may decide whether to accept or reject the request for insertion. The first shared cache level (108) and the second shared cache level (109) of FIG. 1 may transmit requests and data over a bus (166) that is controlled by a bus manager (191).

Each of the processors (102) of FIG. 1 includes L1 memory. L1 is a relatively small, high speed cache fabricated into the processor itself, on the same chip. The MMU (106) includes address translation logic, a translation lookaside buffer, controls for the on-processor cache L1, and so on.

The main memory (114) is the principal, random access store of program data and program instructions for data processing on the computer (100). Main memory (114) is characterized by memory latency, the time required for a memory access, a read or write to or from main memory. Main memory (114) implements a single extent of physical address space shared among the processor (102).

The caches L1 and L2 (181) are specialized segments of memory used by the processors (102) to reduce memory access latency. Each cache is smaller and faster than main memory, and each cache stores copies of data from frequently used main memory locations. When a processor needs to read from or write to a location in main memory, it first checks whether a copy of that data, a "cache line," is in a cache. If so, the processor immediately reads from or writes to the cache, which is much faster than reading from or writing to main memory. As long as most memory accesses are cached memory locations, the average latency of memory accesses will be closer to the cache latency than to the latency of main memory. As mentioned, main memory is much slower than any cache, and cache misses extract a heavy toll in memory access latency.

Cache memory is organized in blocks of data referred to as 'cache lines.' Each cache line in different designs may range in size from 8 to 512 bytes or more. The size of a cache line typically is larger than the size of the usual access requested by a CPU instruction, which ranges from 1 to 16 bytes—the largest addresses and data typically handled by current 32 bit- and 64 bit-architectures being 128 bits or 16 bytes in length. Each cache line is characterized by a 'tag' composed of most significant bits of the beginning address where the contents of the cache line are stored in main memory.

In the example of FIG. 1, the processors (102) utilize a multi-level cache with two levels, represented by the L1 cache and the L2 cache (181). Multi-level caches address the tradeoff between cache latency and hit rate. Larger caches have better hit rates but longer latency. To address this tradeoff, many computers use multiple levels of cache, with small fast caches backed up by larger slower caches. Multi-level caches generally operate by checking the smallest Level 1 (L1) cache first; if it hits, the processor proceeds at high speed. If the smaller cache misses, the next larger cache (L2) is checked, and so on, before main memory is checked. The example computer of FIG. 1 implements two cache levels, but this is only for ease of explanation, not for limitation. Many computers implement additional levels of cache, three or even four cache levels. Some processors implement as many as three levels of on-chip cache. For example, the Alpha 21164™ has a 96 KB on-die L3 cache, and the IBM POWER4™ has a 256 MB L3 cache off-chip, shared among several processors.

The cache controller (110) includes the cache directory (112) that is a repository of information regarding cache lines in the caches. The directory records, for each cache line in all of the caches in the computer, the identity of the cache line or cache line "tag," the cache line state, MODIFIED, SHARED, INVALID, and so on, and a bit vector that specifies for each processor whether a copy of a cache line in a low level shared cache is stored in an upper cache level. The MMUs (106) and the cache controllers (110) consult and update the information in the cache directory (112) with every cache operation on a compute node. The cache controller (110), connected directly to the L2 cache (181), has no direct connection to the L1 cache—and obtains information about cache lines in the L1 cache from the cache directory (112).

The cache controller (110) is a logic circuit that manages cache memory, providing an interface among processors (102), caches (L1, L2), and main memory (114). Although the cache controller (110) here is represented externally to the processors (102), cache controllers on modern computers are often integrated directly into a processor or an MMU. In this example, the MMUs (106) in fact include cache control logic for the L1 caches.

In the example of FIG. 1, the cache controller (110) is configured to implement cache management in accordance with the invention. The cache controller (110) of FIG. 1 is configured to receive a request to insert a new cache line into the cache (181); determine whether the new cache line is associated with a forced injection; in response to determining that the new cache line is associated with a forced injection, accepting the insertion of the new cache line into the cache (181); and in response to determining that the new cache line is not associated with a forced injection, determining whether to accept the insertion of the new cache line based on a comparison of an address of the new cache line to a predefined range of addresses. By basing the decision of whether to accept or reject the insertion of the new cache line on a comparison of the address of the new cache line to the predetermined range of addresses, the cache controller (110) may make insertion decisions based on the priority of the address of the new cache line. Incorporating priority considerations in the insertion decision process may improve the effectiveness of the cache controller (110) in optimizing cache utilization.

Figure 2:
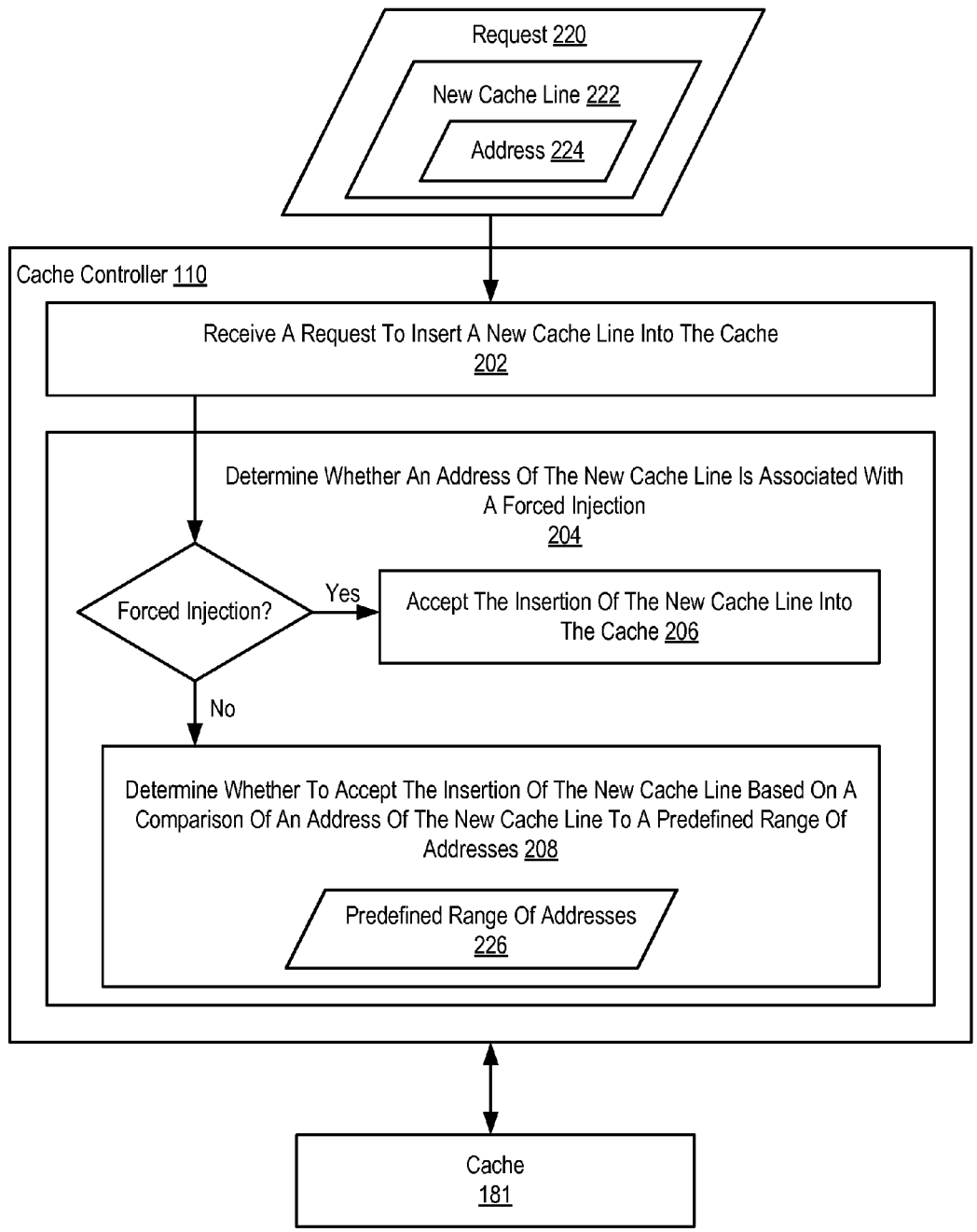
FIG. 2 sets forth a flow chart illustrating an example of a method for cache management according to embodiments of the present invention.

For further explanation, FIG. 2 sets forth a flow chart illustrating an exemplary method for cache management according to embodiments of the present invention. The method of FIG. 2 includes receiving (202), by the cache controller (110), a request (220) to insert a new cache line (222) into a cache (181). Receiving (202) a request (220) to insert a new cache line (222) into a cache (181) may be carried out receiving the request (220) from one of the processors (102) from the second set (194) of processors over the bus (166).

The method of FIG. 2 also includes determining (204), by the cache controller (110), whether the new cache line (222) is associated with a forced injection. Determining (204) whether the new cache line (222) is associated with a forced injection may be carried out by examining the request (220) and determining if the request (220) indicates that the new cache line (222) is associated with a forced injection. A forced injection is an indication that the cache controller (110) must accept the new cache line (222), regardless of the address (224) associated with the new cache line (222).

The method of FIG. 2 includes in response to determining that the new cache line (222) is associated with a forced injection, accepting (206), by the cache controller (110), the insertion of the new cache line (222) into the cache (181). Accepting (206) the insertion of the new cache line (222) into the cache (181) in response to determining that the new cache line (222) is associated with a forced injection may be carried out by transmitting an acceptance of the request (220) from the cache controller (110) to another cache controller (not pictured) within the second shared cache level (109) associated with the second set (194) of processors.

The method of FIG. 2 also includes in response to determining that the new cache line (222) is not associated with a forced injection, determining (208), by the cache controller (110), whether to accept the insertion of the new cache line (222) based on a comparison of the address (224) of the new cache line (222) to a predefined range of addresses (226). The address (224) of the new cache line (222) may be based on a real memory address of the main memory (114). Determining (208) whether to accept the insertion of the new cache line (222) based on a comparison of the address (224) of the new cache line (222) to a predefined range of addresses (226) in response to determining that the new cache line (222) is not associated with a forced injection may be carried out by establishing one or more predefined ranges of addresses (226), storing the predefined ranges of addresses (226) in the directory (112), in a cache line, the cache controller (110), and so on; identifying the highest address and the lowest address in the predefined range of addresses (226) and determining if the address (224) of the new cache line (222) exceeds the highest address or is below the lowest address. Determining which ranges of addresses should be in the predetermined range of addresses may be based on factors such as directory lookup or a design consideration (e.g., size of latches in cache (181) vs. time for victim selection decisions).

Figure 3:
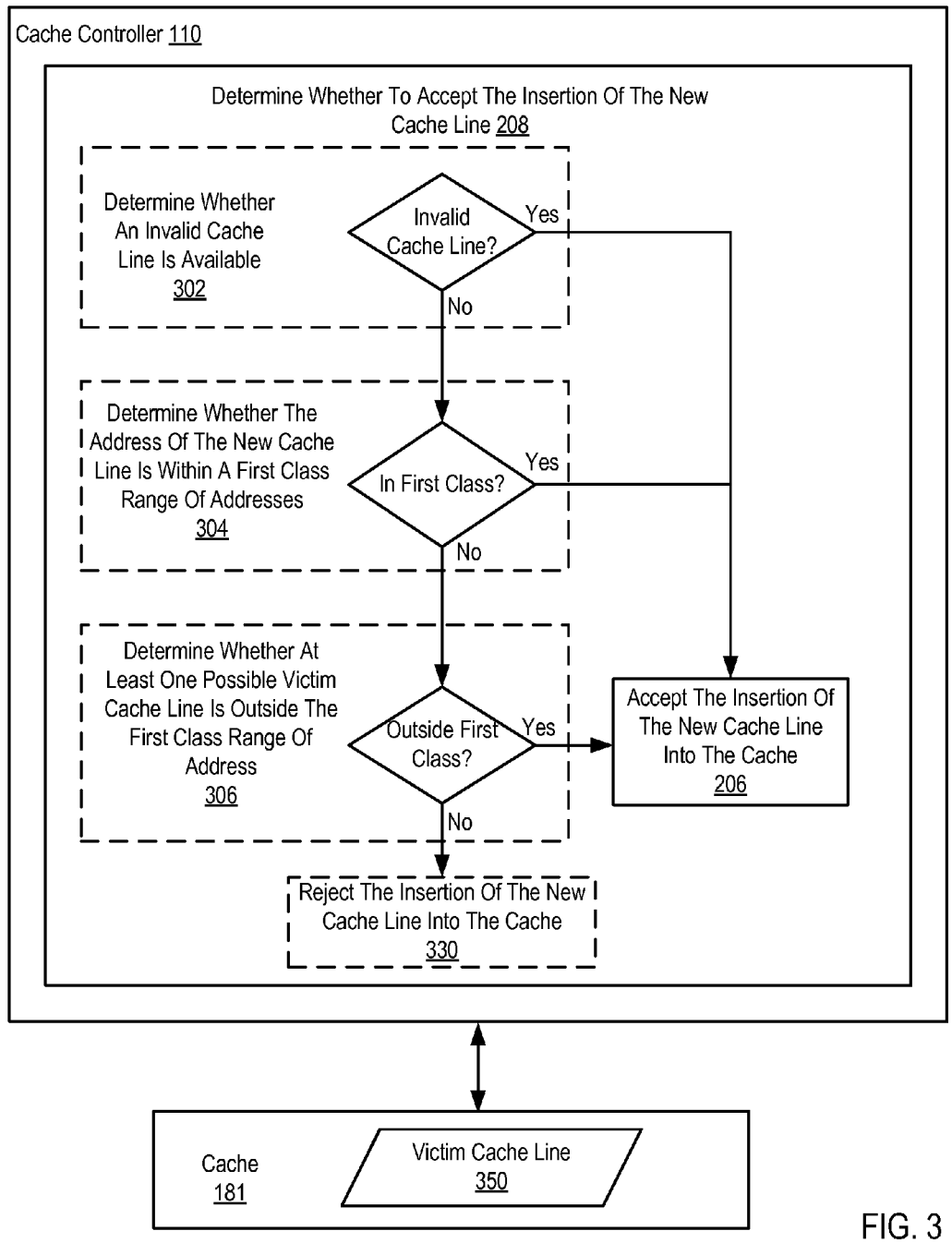
FIG. 3 sets forth a flow chart illustrating another example of a method for cache management according to embodiments of the present invention.

For further explanation, FIG. 3 sets forth a flow chart illustrating a further exemplary method for cache management according to embodiments of the present invention. The method of FIG. 3 includes the following elements of the method of FIG. 2: receiving (202), by the cache controller (110), a request (220) to insert a new cache line (222) into a cache (181); determining (204), by the cache controller (110), whether the new cache line (222) is associated with a forced injection; in response to determining that the new cache line (222) is associated with a forced injection, accepting (206), by the cache controller (110), the insertion of the new cache line (222) into the cache (181); and in response to determining that the new cache line (222) is not associated with a forced injection, determining (208), by the cache controller (110), whether to accept the insertion of the new cache line (222) based on a comparison of the address (224) of the new cache line (222) to a predefined range of addresses (226).

The elements of FIG. 3 that differ from the method of FIG. 2 are illustrated in FIG. 3 with a dashed line. More particularly, those elements include: determining (302), by the cache controller (110), whether an invalid cache line is available; in response to determining that an invalid cache line is not available, determining (304), by the cache controller (110), whether the address (224) of the new cache line (222) is within a first class range of addresses; in response to determining that the address (224) of the new cache line (222) is not within the first class range of addresses, determining (306), by the cache controller (110), whether at least one possible victim cache line is outside of the first class range of addresses; in response to determining that the at least one possible victim cache line is not outside of the first class range of addresses, rejecting (330), by the cache controller (110), the insertion of the new cache line (222) into the cache (181).

In the method of FIG. 3, determining (208), by the cache controller (110), whether to accept the insertion of the new cache line (222) based on a comparison of the address (224) of the new cache line (222) to a predefined range of addresses (226) includes determining (302), by the cache controller (110), whether an invalid cache line is available. Determining (302) whether an invalid cache line is available may be carried out by determining if a particular cache line within the cache (181) has expired or been invalided and identifying any invalided cache lines. A particular cache line may expire or be invalided when the particular cache line is no longer in use or has become outdated or corrupted.

In the method of FIG. 3, determining (208), by the cache controller (110), whether to accept the insertion of the new cache line (222) based on a comparison of the address (224) of the new cache line (222) to a predefined range of addresses (226) includes in response to determining that an invalid cache line is available, accepting (206), by the cache controller (110), the insertion of the new cache line (222) into the cache (181). Accepting (206) the insertion of the new cache line (222) into the cache (181) in response to determining that an invalid cache line is available may be carried out by transmitting an acceptance of the request (220) from the cache controller (110) to another cache controller (not pictured) within the second shared cache level (109) associated with the second set (194) of processors.

In the method of FIG. 3, determining (208), by the cache controller (110), whether to accept the insertion of the new cache line (222) based on a comparison of the address (224) of the new cache line (222) to a predefined range of addresses (226) includes in response to determining that an invalid cache line is not available, determining (304), by the cache controller (110), whether the address (224) of the new cache line (222) is within a first class range of addresses. Determining (304) whether the address (224) of the new cache line (222) is within a first class range of addresses may be carried out by receiving a user programmable entry indicating a range of addresses to assign to the first class range of addresses; assigning a range of address to the first class range of addresses; and comparing the addresses (224) of the new cache line (222) with the highest address and the lowest addresses that comprise the first class range of addresses. In this case, the first class range of addresses may be selected to indicate which range of addresses warrant insertion.

The particular class that a cache line is assigned may be based on other considerations besides the address of the particular cache line. For example, in response to moving the particular cache line from one shared cache level to another shared cache level, the class that the particular cache line is assigned to may be changed without the address of the cache line changing.

In the method of FIG. 3, determining (208), by the cache controller (110), whether to accept the insertion of the new cache line (222) based on a comparison of the address (224) of the new cache line (222) to a predefined range of addresses (226) includes in response to determining that the address (224) of the new cache line (222) is within the first class range of addresses, accepting (206), by the cache controller (110), the insertion of the new cache line (222) into the cache (181). Accepting (206) the insertion of the new cache line (222) into the cache (181) in response to determining that the address (224) of the new cache line (222) is within the first class range of addresses may be carried out by transmitting an acceptance of the request (220) from the cache controller (110) to another cache controller (not pictured) within the second shared cache level (109) associated with the second set (194) of processors.

In the method of FIG. 3, determining (208), by the cache controller (110), whether to accept the insertion of the new cache line (222) based on a comparison of the address (224) of the new cache line (222) to a predefined range of addresses (226) includes in response to determining that the address (224) of the new cache line (222) is not within the first class range of addresses, determining (306), by the cache controller (110), whether at least one possible victim cache line is outside of the first class range of addresses. Determining (306) whether at least one possible victim cache line is outside of the first class range of addresses in response to determining that the address (224) of the new cache line (222) is not within the first class range of addresses may be carried out by receiving a user programmable entry indicating a range of addresses to assign to the first class range of addresses; assigning a range of address to the first class range of addresses; comparing the addresses of the cache lines in the cache (181) with the highest address and the lowest addresses that comprise the first class range of addresses; identifying which cache lines have addresses outside of the first class range of addresses; and labeling any identified cache lines as possible victim cache lines. In this case, a victim cache line is a potential cache line that may be replaced with the new cache line.

In the method of FIG. 3, determining (208), by the cache controller (110), whether to accept the insertion of the new cache line (222) based on a comparison of the address (224) of the new cache line (222) to a predefined range of addresses (226) includes in response to determining that the at least one possible victim cache line is outside of the first class range of addresses, accepting (206), by the cache controller (110), the insertion of the new cache line (222). Accepting (206), by the cache controller (110), the insertion of the new cache line (222) in response to determining that the at least one possible victim cache line is outside of the first class range of addresses may be carried out by transmitting an acceptance of the request (220) from the cache controller (110) to another cache controller (not pictured) within the second shared cache level (109) associated with the second set (194) of processors.

In the method of FIG. 3, determining (208), by the cache controller (110), whether to accept the insertion of the new cache line (222) based on a comparison of the address (224) of the new cache line (222) to a predefined range of addresses (226) includes in response to determining that the at least one possible victim cache line is not outside of the first class range of addresses, rejecting (330), by the cache controller (110), the insertion of the new cache line (222) into the cache (181). Rejecting (330), by the cache controller (110), the insertion of the new cache line (222) into the cache (181) in response to determining that the at least one possible victim cache line is not outside of the first class range of addresses may be carried out by transmitting a rejection of the request (220) from the cache controller (110) to another cache controller (not pictured) within the second shared cache level (109) associated with the second set (194) of processors. When the cache controller (110) rejects the request (220), the new cache line (222) is not inserted into the cache (181). In this case, all of the cache lines in the cache (181) have a higher priority than the new cache line (222).

Figure 4:
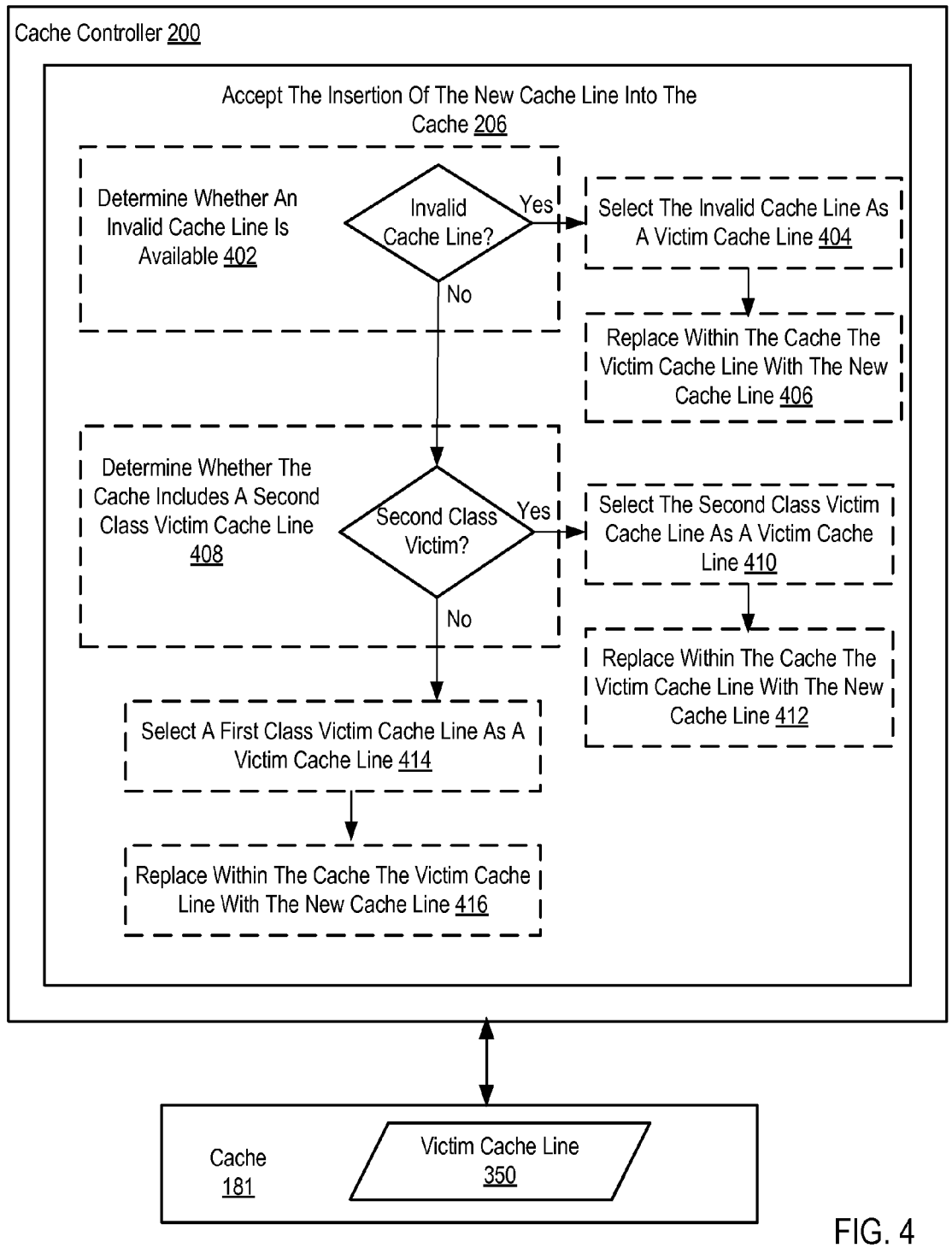
FIG. 4 sets forth a flow chart illustrating another example of a method for cache management according to embodiments of the present invention.

For further explanation, FIG. 4 sets forth a flow chart illustrating a further exemplary method for cache management according to embodiments of the present invention. The method of FIG. 4 includes the following elements of the method of FIG. 2: in response to determining that the new cache line (222) is associated with a forced injection, accepting (206), by the cache controller (110), the insertion of the new cache line (222) into the cache (181).

The elements of FIG. 4 that differ from the method of FIG. 2 are illustrated in FIG. 4 with a dashed line. More particularly, those elements include: determining (402), by the cache controller (110), whether an invalid cache line is available; in response to determining that an invalid cache line is available, selecting (404), by the cache controller (110), the invalid cache line as a victim cache line (350); in response to determining that an invalid cache line is available, replacing (406) within the cache (181), by the cache controller (110), the victim cache line (350) with the new cache line (222); in response to determining that an invalid cache line is not available, determining (408), by the cache controller (110), whether the cache (181) includes a second class victim cache line; in response to determining that the cache includes a second class victim cache line, selecting (410), by the cache controller (110), the second class victim cache line as the victim cache line (350); in response to determining that the cache includes a second class victim cache line, replacing (412) within the cache (181), by the cache controller (110), the victim cache line (350) with the new cache line (222); in response to determining that the cache does not include a second class victim cache line, selecting (414), by the cache controller (110), a first class victim cache line as the victim cache line (350); in response to determining that the cache does not include a second class victim cache line, replacing (416) within the cache (181), by the cache controller (181), the victim cache line (350) with the new cache line (222).

In the method of FIG. 4, accepting (206) the insertion of the new cache line (222) into the cache (181) includes determining (402), by the cache controller (110), whether an invalid cache line is available. Determining (402) whether an invalid cache line is available may be carried out by determining if a particular cache line within the cache (181) has expired or been invalided and identifying any invalided cache lines.

In the method of FIG. 4, accepting (206) the insertion of the new cache line (222) into the cache (181) includes in response to determining that an invalid cache line is available, selecting (404), by the cache controller (110), the invalid cache line as a victim cache line (350). Selecting (404) the invalid cache line as a victim cache line (350) in response to determining that an invalid cache line is available may be carried out by identifying at least of the invalid cache lines as a victim cache line; and storing the identification of the invalid cache line as the victim cache line in the cache controller (110).

In the method of FIG. 4, accepting (206) the insertion of the new cache line (222) into the cache (181) includes in response to determining that an invalid cache line is available, replacing (406) within the cache (181), by the cache controller (110), the victim cache line (350) with the new cache line (222). Replacing (406) within the cache (181) the victim cache line (350) with the new cache line (222) in response to determining that an invalid cache line is available may be carried out by determining which cache physical location the victim cache line (350) occupies; and transmitting from the cache controller (110) a command to the cache (181) to store the new cache line (222) in the cache physical location occupied by the victim cache line (350).

In the method of FIG. 4, accepting (206) the insertion of the new cache line (222) into the cache (181) includes in response to determining that an invalid cache line is not available, determining (408), by the cache controller (110), whether the cache (181) includes a second class victim cache line. Determining (408) whether the cache (181) includes a second class victim cache line in response to determining that an invalid cache line is not available may be carried out by receiving an input from a user indicating which ranges of address are to be associated with a second class range of addresses; assigning the range of address to the second class range of addresses; and determining if any of the cache lines in the cache (181) include addresses that are within the addresses assigned to the second class range of addresses. In this case, the second class victim cache line has an address that is within a second class range of addresses. The second class range of addresses may be a range of addresses that have a lower priority than the range of addresses associated with the first class range of addresses. In this case, the method of FIG. 4 attempts to replace a second class victim before a first class victim.

In the method of FIG. 4, accepting (206) the insertion of the new cache line (222) into the cache (181) includes in response to determining that the cache includes a second class victim cache line, selecting (410), by the cache controller (110), the second class victim cache line as the victim cache line (350). Selecting (410) the second class victim cache line as the victim cache line (350) in response to determining that the cache includes a second class victim cache line may be carried out by identifying at least of the second class victim cache lines as a victim cache line; and storing the identification of the selected second class victim cache line as the victim cache line in the cache controller (110).

In the method of FIG. 4, accepting (206) the insertion of the new cache line (222) into the cache (181) includes in response to determining that the cache includes a second class victim cache line, replacing (412) within the cache (181), by the cache controller (110), the victim cache line (350) with the new cache line (222). Replacing (412) within the cache (181) the victim cache line (350) with the new cache line (222) in response to determining that the cache (181) includes a second class victim cache line may be carried out by determining which cache physical location the victim cache line (350) occupies; and transmitting from the cache controller (110) a command to the cache (181) to store the new cache line (222) in the cache physical location occupied by the victim cache line (350).

In the method of FIG. 4, accepting (206) the insertion of the new cache line (222) into the cache (181) includes in response to determining that the cache does not include a second class victim cache line, selecting (414), by the cache controller (110), a first class victim cache line as the victim cache line (350). Selecting (414) a first class victim cache line as the victim cache line (350) in response to determining that the cache does not include a second class victim cache line may be carried out by identifying at least of the first class victim cache lines as a victim cache line; and storing the identification of the selected first class victim cache line as the victim cache line in the cache controller (110).

In the method of FIG. 4, accepting (206) the insertion of the new cache line (222) into the cache (181) includes in response to determining that the cache does not include a second class victim cache line, replacing (416) within the cache (181), by the cache controller (181), the victim cache line (350) with the new cache line (222). Replacing (416) within the cache (181) the victim cache line (350) with the new cache line (222) in response to determining that the cache does not include a second class victim cache line may be carried out by determining which cache physical location the victim cache line (350) occupies; and transmitting from the cache controller (110) a command to the cache (181) to store the new cache line (222) in the cache physical location occupied by the victim cache line (350).

Exemplary embodiments of the present invention are described largely in the context of a fully functional computer system for cache management. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A request for a cache control operation includes inserting a new cache line into a cache. Those of skill in the art will recognize that a cache control operation may include any number of operations involving a cache and is not limited to inserting a new cache line into a cache. It will be understood from the foregoing description that modifications and changes may be made in various embodiments of the present invention without departing from its true spirit. The descriptions in this specification are for purposes of illustration only and are not to be construed in a limiting sense.

The scope of the present invention is limited only by the language of the following claims.

What is claimed is:

1. A method of cache management, the method comprising:
   receiving, by a first cache controller, a request for a cache control operation to insert a new cache line into a cache, wherein the cache is coupled to a first processor by the first cache controller and the request is received from a second processor via a second cache controller;
   determining, by the first cache controller, whether the request represents a forced cache injection;
   in response to determining that the request represents the forced cache injection, accepting, by the first cache controller, an insertion of the new cache line into the cache; and
   in response to determining that the request does not represent the forced injection, determining, by the first cache controller, whether to accept the insertion of the new cache line into the cache based on a comparison of an address of the new cache line to a predefined range of addresses.

2. The method of claim 1, wherein determining whether to accept the insertion of the new cache line into the cache based on the comparison of the address of the new cache line to the predefined range of addresses further comprises:
   determining, by the first cache controller, whether an invalid cache line is available; and
   in response to determining that the invalid cache line is available, accepting, by the first cache controller, the insertion of the new cache line into the cache.

3. The method of claim 2, wherein determining whether to accept the insertion of the new cache line into the cache based on the comparison of the address of the new cache line to the predefined range of addresses further comprises:
   in response to determining that the invalid cache line is not available, determining, by the first cache controller, whether the address of the new cache line is within a first class range of addresses;
   in response to determining that the address of the new cache line is within the first class range of addresses, accepting, by the first cache controller, the insertion of the new cache line into the cache.

4. The method of claim 3, wherein determining whether to accept the insertion of the new cache line into the cache based on the comparison of the address of the new cache line to the predefined range of addresses further comprises:
   in response to determining that the address of the new cache line is not within the first class range of addresses, determining, by the first cache controller, whether at least one possible victim cache line is outside of the first class range of addresses;
   in response to determining that the at least one possible victim cache line is outside of the first class range of addresses, accepting, by the first cache controller, the insertion of the new cache line;
   in response to determining that the at least one possible victim cache line is not outside of the first class range of addresses, rejecting, by the first cache controller, the insertion of the new cache line into the cache.

5. The method of claim 1, wherein accepting the insertion of the new cache line into the cache comprises:
   determining, by the first cache controller, whether an invalid cache line is available; and
   in response to determining that the invalid cache line is available, selecting, by the first cache controller, the invalid cache line as a victim cache line and replacing within the cache, by the first cache controller, the victim cache line with the new cache line.

6. The method of claim 5, wherein accepting the insertion of the new cache line into the cache further comprises:
   in response to determining that the invalid cache line is not available, determining, by the first cache controller, whether the cache includes a second class victim cache line, wherein the second class victim cache line has an address that is within a second class range of addresses;
   in response to determining that the cache includes the second class victim cache line, selecting, by the first cache controller, the second class victim cache line as the victim cache line and replacing within the cache, by the first cache controller, the victim cache line with the new cache line; and
   in response to determining that the cache does not include the second class victim cache line, selecting, by the first cache controller, a first class victim cache line as the victim cache line and replacing within the cache, by the first cache controller, the victim cache line with the new cache line.

7. An apparatus for cache management, the apparatus including a cache controller that controls a cache memory, the cache controller configured to function by:
   receiving, by a first cache controller, a request for a cache control operation to insert a new cache line into a cache, wherein the cache is coupled to a first processor by the first cache controller and the request is received from a second processor via a second cache controller;
   determining, by the first cache controller, whether the request represents a forced cache injection;
   in response to determining that the request represents the forced cache injection, accepting, by the first cache controller, an insertion of the new cache line into the cache; and
   in response to determining that the request does not represent the forced injection, determining, by the first cache controller, whether to accept the insertion of the new cache line into the cache based on a comparison of an address of the new cache line to a predefined range of addresses.

8. The apparatus of claim 7, wherein determining whether to accept the insertion of the new cache line into the cache based on the comparison of the address of the new cache line to the predefined range of addresses further comprises:
- determining, by the first cache controller, whether an invalid cache line is available; and
- in response to determining that the invalid cache line is available, accepting, by the first cache controller, the insertion of the new cache line into the cache.

9. The apparatus of claim 8, wherein determining whether to accept the insertion of the new cache line into the cache based on the comparison of the address of the new cache line to the predefined range of addresses further comprises:
- in response to determining that the invalid cache line is not available, determining, by the first cache controller, whether the address of the new cache line is within a first class range of addresses;
- in response to determining that the address of the new cache line is within the first class range of addresses, accepting, by the first cache controller, the insertion of the new cache line into the cache.

10. The apparatus of claim 9, wherein determining whether to accept the insertion of the new cache line into the cache based on the comparison of the address of the new cache line to the predefined range of addresses further comprises:
- in response to determining that the address of the new cache line is not within the first class range of addresses, determining, by the first cache controller, whether at least one possible victim cache line is outside of the first class range of addresses;
- in response to determining that the at least one possible victim cache line is outside of the first class range of addresses, accepting, by the first cache controller, the insertion of the new cache line;
- in response to determining that the at least one possible victim cache line is not outside of the first class range of addresses, rejecting, by the first cache controller, the insertion of the new cache line into the cache.

11. The apparatus of claim 7, wherein accepting the insertion of the new cache line into the cache comprises:
- determining, by the first cache controller, whether an invalid cache line is available; and
- in response to determining that the invalid cache line is available, selecting, by the first cache controller, the invalid cache line as a victim cache line and replacing within the cache, by the first cache controller, the victim cache line with the new cache line.

12. The apparatus of claim 11, wherein accepting the insertion of the new cache line into the cache further comprises:
- in response to determining that the invalid cache line is not available, determining, by the first cache controller, whether the cache includes a second class victim cache line, wherein the second class victim cache line has an address that is within a second class range of addresses;
- in response to determining that the cache includes the second class victim cache line, selecting, by the first cache controller, the second class victim cache line as the victim cache line and replacing within the cache, by the first cache controller, the victim cache line with the new cache line; and
- in response to determining that the cache does not include the second class victim cache line, selecting, by the first cache controller, a first class victim cache line as the victim cache line and replacing within the cache, by the first cache controller, the victim cache line with the new cache line.

13. A computer program product, the computer program product comprising a non-transitory computer readable storage medium having computer readable program code configured to:
- receiving, by a first cache controller, a request for a cache control operation to insert a new cache line into a cache, wherein the cache is coupled to a first processor by the first cache controller and the request is received from a second processor via a second cache controller;
- determining, by the first cache controller, whether the request represents a forced cache injection;
- in response to determining that the request represents the forced cache injection, accepting, by the first cache controller, an insertion of the new cache line into the cache; and
- in response to determining that the request does not represent the forced injection, determining, by the first cache controller, whether to accept the insertion of the new cache line into the cache based on a comparison of an address of the new cache line to a predefined range of addresses.

14. The computer program product of claim 13, wherein the computer readable program code configured to determine whether to accept the insertion of the new cache line into the cache based on the comparison of the address of the new cache line to the predefined range of addresses further comprises computer readable program code configured to:
- determine, by the first cache controller, whether an invalid cache line is available; and
- in response to determining that the invalid cache line is available, accept, by the first cache controller, the insertion of the new cache line into the cache.

15. The computer program product of claim 14, wherein the computer readable program code configured to determine whether to accept the insertion of the new cache line into the cache based on the[[a]] comparison of the address of the new cache line to the predefined range of addresses further comprises computer readable program code configured to:
- in response to determining that the invalid cache line is not available, determine, by the first cache controller, whether the address of the new cache line is within a first class range of addresses;
- in response to determining that the address of the new cache line is within the first class range of addresses, accept, by the first cache controller, the insertion of the new cache line into the cache.

16. The computer program product of claim 15, wherein the computer readable program code configured to determine whether to accept the insertion of the new cache line into the cache based on the comparison of the address of the new cache line to the predefined range of addresses further comprises computer readable program code configured to:
- in response to determining that the address of the new cache line is not within the first class range of addresses, determine, by the first cache controller, whether at least one possible victim cache line is outside of the first class range of addresses;
- in response to determining that the at least one possible victim cache line is outside of the first class range of addresses, accept, by the first cache controller, the insertion of the new cache line;
- in response to determining that the at least one possible victim cache line is not outside of the first class range of addresses, reject, by the first cache controller, the insertion of the new cache line into the cache.

17. The computer program product of claim 13, wherein the computer readable program code configured to accept the insertion of the new cache line into the cache comprises computer readable program code configured to:
- determine, by the first cache controller, whether an invalid cache line is available; and
- in response to determining that the invalid cache line is available, select, by the first cache controller, the invalid cache line as a victim cache line and replace within the cache, by the first cache controller, the victim cache line with the new cache line.

18. The computer program product of claim 17, wherein the computer readable program code configured to accept the insertion of the new cache line into the cache further comprises computer readable program code configured to:
- in response to determining that the invalid cache line is not available, determine, by the first cache controller, whether the cache includes a second class victim cache line, wherein the second class victim cache line has an address that is within a second class range of addresses;
- in response to determining that the cache includes the second class victim cache line, select, by the first cache controller, the second class victim cache line as the victim cache line and replace within the cache, by the first cache controller, the victim cache line with the new cache line; and
- in response to determining that the cache does not include the second class victim cache line, select, by the first cache controller, a first class victim cache line as the victim cache line and replace within the cache, by the first cache controller, the victim cache line with the new cache line.

* * * * *